United States Patent [19]
Wirobski et al.

[11] Patent Number: 5,618,478
[45] Date of Patent: Apr. 8, 1997

[54] PROCESS FOR PRODUCING MOLDINGS FROM FOAMED POLYOLEFINS

[75] Inventors: Reinhard Wirobski, Marl; Michael Traeger, Haltern, both of Germany

[73] Assignee: Huels Aktiengesellschaft, Marl, Germany

[21] Appl. No.: 623,865

[22] Filed: Mar. 29, 1996

[30] Foreign Application Priority Data

Mar. 31, 1995 [DE] Germany .......................... 195 12 059.0

[51] Int. Cl.⁶ .................................. B29C 44/02
[52] U.S. Cl. .................. 264/50; 264/51; 264/53
[58] Field of Search ................ 264/50, 51, 45.4, 264/53

[56] References Cited

U.S. PATENT DOCUMENTS

| | | | |
|---|---|---|---|
| 2,768,407 | 10/1956 | Lindemann | 264/50 |
| 3,504,068 | 3/1970 | Zizlsperger et al. | 264/41 |
| 4,685,872 | 8/1987 | Erlenbach | 264/50 |
| 4,818,451 | 4/1989 | Arai et al. | 264/50 |
| 5,308,560 | 5/1994 | Bibby et al. | 264/50 |
| 5,380,766 | 1/1995 | Traeger et al. | |
| 5,480,599 | 1/1996 | Leven et al. | |

*Primary Examiner*—Allan R. Kuhns
*Attorney, Agent, or Firm*—Oblon, Spivak, McClelland, Maier & Neustadt, P.C.

[57] ABSTRACT

A process for producing a molding from prefoamed polyolefin particles, involving: shrinking the prefoamed polyolefin particles to a volume of from 30 to 95% of the prefoamed polyolefin particles original volume to provide shrunken particles; treating the shrunken particles at a temperature lying at least 20° C. below the softening temperature of the shrunken particles, in an inert gas atmosphere under a gauge pressure of from 0.2 to 10 bar, for a time sufficient to provide expansion of the shrunken particles upon removal of the pressure; charging the particles into a mold with substantial maintenance of internal pressure of the particles; and foaming the particles, to provide moldings of very low density useful in applications such as packaging and soft upholstering in motor vehicle interiors.

9 Claims, No Drawings

PROCESS FOR PRODUCING MOLDINGS FROM FOAMED POLYOLEFINS

BACKGROUND OF THE INVENTION

1. Field of the Invention

The present invention relates to a process for producing very light moldings from polyolefin foam particles of high density.

2. Discussion of the Background

Processes for producing polyolefin foam particles are known. For example, in DE-A-21 55 775, a dispersion of polymer particles in a liquid dispersion medium is heat-treated under pressure. During this heat treatment, a part of the dispersion medium is dissolved with stirring in the polymer. After a treatment time of about 30 minutes, the reactor contents are discharged into a low-pressure chamber at ambient temperature. This results in expansion of the polymer particles to give foam beads. Particularly uniform foam qualities are supposed to be achieved by addition of organic or inorganic fillers to the polymer.

The foaming of ethylene/propylene random copolymers is described in EP-A-0 053 333 through the use of a system comprising polymer particles, water as dispersion medium, a solid dispersing aid and a volatile blowing agent.

Particles produced by dispersion or extrusion foaming can also be obtained in shrunken form. For example, DE-A-25 24 196 describes how the bulk density of light foam particles can be increased by shrinking. This is achieved by subsequent heating and pressing together, with the goal being to produce foamed articles having a high density.

EP-A-0 453 836 describes foam particles which, after expansion, shrink to as little as 40% of their original volume. These are post-treated under pressure and temperature to reverse the shrinkage, so that foam beads having a bulk density of 10 g/l are obtained. EP-A-0 453 836 thus teaches that shrunken foam beads cannot be directly used in the production of light moldings.

Similarly, DE-A-39 22 207 describes an undesired shrinking after the expansion. By means of post-treatment under pressure and at relatively high temperature, the foam beads regain their original volume.

Finally, JP-A-04/015 236 describes specific conditions which must be adhered to in the expansion process to obtain shrunken foam particles. As an example, shrunken foam particles having a bulk density of 25 g/l are obtained; on processing into moldings, a density of 23.1 g/l is achieved. Without influencing the foaming process, a bulk density of 16.3 g/l is obtained. From this, moldings having a density of 24.4 g/l can be produced. The advantage of this process is lower transport costs compared with the lighter material.

Thus it was known, on the one hand, that shrunken foam particles can be used directly for producing moldings. However, on the other hand, the quality of these moldings is described as unsatisfactory; in addition, the density of the moldings is restricted to values lying in the region of the bulk density of the shrunken foam particles.

In the prior art (EP-A-0 453 836; DE-A-39 22 207), these disadvantages are overcome by the shrinkage first being reversed by a further expansion of the shrunken particles. The particles thus obtained are then used for production of moldings. However, this process is not satisfactory since the additional expansion step is complicated and expensive. In addition, the densities of the moldings produced in this way are still too high for many purposes.

SUMMARY OF THE PRESENT INVENTION

Accordingly, one object of the present invention is to provide a process for producing moldings having a density which is as low as possible from prefoamed polyolefin particles of high density.

A further object of the present invention is to provide a process which starts from foam particles of high density, and produces moldings whose density can easily be adjusted by variation of simple process parameters.

These and other objects of the present invention have been satisfied by the discovery of a process for producing a molding from prefoamed polyolefin particles, comprising:

shrinking the prefoamed polyolefin particles to a volume of from 30 to 95% of the prefoamed polyolefin particles original volume to provide shrunken particles;

treating the shrunken particles at a temperature lying at least 20° C. below a softening temperature of the shrunken particles, in an inert gas atmosphere under a gauge pressure of from 0.2 to 10 bar, for a time sufficient to provide foaming of the shrunken particles upon removal of said gauge pressure;

charging the particles into a mold with substantial maintenance of internal pressure of the particles; and foaming the particles.

DETAILED DESCRIPTION OF THE PREFERRED EMBODIMENTS

The present invention relates to a process for producing a molding from prefoamed polyolefin particles, comprising:

shrinking the prefoamed polyolefin particles to a volume of from 30 to 95% of the prefoamed polyolefin particles original volume to provide shrunken particles;

treating the shrunken particles at a temperature lying at least 20° C. below the softening temperature of the shrunken particles, in an inert gas atmosphere under a gauge pressure of from 0.2 to 10 bar, for a time sufficient to provide expansion of the shrunken particles upon removal of said gauge pressure;

charging the particles into a mold with substantial maintenance of internal pressure of the particles; and foaming the particles.

It is preferred that, within the practice of the present invention, the shrunken particles are essentially free of volatile organic blowing agent.

Suitable polyolefins for use in the present process include propylene polymers, such as propylene-ethylene or propylene-but-1-ene random copolymers, random terpolymers of ethylene, propylene and but-1-ene, ethylene-propylene block copolymers and homopolypropylene, ethylene polymers such as polyethylene of low, intermediate or high density, linear polyethylene of low density, ethylene-vinyl acetate copolymers, ethylene-methyl methacrylate copolymers, ionomers or other polyolefins such as polybut-1-ene. Preference is given to using an ethylene-propylene random copolymer containing from 1 to 15% by weight of ethylene. The ethylene content is more preferably from 1 to 10% by weight and most preferably from 2 to 5% by weight. The molecular weight of the polyolefin is not critical, so long as the polymer has sufficient molecular weight to provide a foamed article. Suitable molecular weights are those conventionally used in the preparation of foamed polyolefins.

For the purposes of the invention, the polyolefin can be prefoamed by conventional processes, such as by the extrusion process or preferably by the dispersion process. Both of these processes are well known to those skilled in the art.

In the dispersion process, the polyolefin is present in the form of discrete particles. These have a mean particle diameter of preferably from 0.5 to 5 m. To achieve uniform foaming, the particles can, if desired, contain a filler which acts as a nucleating agent. Suitable fillers are those which are conventionally used in polyolefins as nucleating agents, which are well known to those of skill in the art.

Water is preferably used as the dispersion medium. However, alcohols such as methanol or ethanol are also suitable.

To prevent agglomeration, a finely-divided dispersing aid and/or a surface-active compound can be added to the mixture of polymer particles and dispersion medium. Examples of such suitable dispersing aids and surface-active compounds include calcium phosphate, basic magnesium carbonate, basic zinc carbonate, calcium carbonate, aluminum oxide, barium sulphate, talc, alkylbenzenesulphonates, paraffin sulphonates or ethoxylates.

To adjust the density of the foam beads, it is preferable to also add a volatile blowing agent. Suitable blowing agents are those known from the prior art, including, but not limited to, saturated aliphatic hydrocarbons such as ethane, propane, n-butane, i-butane, pentane or hexane, alicyclic hydrocarbons such as cyclopentane or cyclohexane, halogenated hydrocarbons such as trichloromonofluoromethane, dichlorodifluoromethane, dichlorotetrafluoroethane, trichlorotrifluoroethane, dichloromonofluoromethane, methyl chloride, methylene chloride or ethyl chloride and also inorganic gases, such as carbon dioxide or nitrogen. These volatile blowing agents can be used singly or as a mixture of two or more blowing agents.

The degree of shrinkage of the prefoamed particles obtained can be determined by loading them under an air pressure of 10 bar for 2 hours at 80° C. The particles are subsequently taken out and brought to room temperature and atmospheric pressure, whereby the shrinkage is reversed. Comparison of the bulk densities allows the percentage increase in volume of the shrunken particles to be calculated easily.

The process parameters which lead to shrinkage of the original prefoamed particles are known in principle. For example, the shrinkage can be effected subsequently, as described in DE-A-25 24 196. However, foaming is preferably carried out in such a way that shrunken particles are obtained directly. Process measures which provide for this include:

expansion of the dispersion in a heated low-pressure chamber as in JP-A-04/015 236;

use of a rapidly diffusing $C_3$- to $C_5$- hydrocarbon as blowing agent as in DE-A-39 22 207 or EP-A-0 453 836;

use of relatively large amounts of blowing agent in the impregnation or increasing the temperature in the impregnation or foaming. Of course, such measures can also be combined. For the final pressure loading, the shrunken particles are treated, generally between room temperature (20° C.) and a temperature $\geq 20°$ C., preferably $\geq 30°$ C., below the softening temperature of the polymer, with an inert gas under a gauge pressure of from 0.2 to 10 bar, preferably from 0.5 to 6 bar, for a sufficient time, generally from 5 minutes to 20 hours. The optimum time depending on pressure and temperature can easily be determined by preliminary experiments.

Examples of inert gas which can be used here are air, nitrogen or $CO_2$.

After carrying out the pressure loading, the shrunken foam particles have an internal pressure which is higher than atmospheric pressure.

The pressure-loaded shrunken particles are subsequently charged into a mold with substantial maintenance of the internal pressure. Here, the product can be taken from the pressure container either continuously or batchwise. It should be ensured that the amount of product discharged in each case is processed into moldings within 30 minutes, preferably within 15 minutes.

In a preferred embodiment, the product is conveyed from the pressure container through a section of pipe directly into the mold, with a pressure difference acting as the driving force. The pressure in the mold is here lower than that in the pressure container and can also be in the region of atmospheric pressure. Thus, a pressure drop takes place in the section of pipe, causing the particles being conveyed to expand somewhat. Thus, the internal pressure of the particles here falls by an amount proportional to the pressure drop from the pressure container to the mold. Within the context of the present invention, this pressure drop is expressly encompassed by the phrase "with substantial maintenance of the internal pressure".

The process of the invention allows very light moldings to be produced in a simple manner. Densities of below 20 g/l, for example in the region of 10 g/l, can be achieved without difficulty in this way. However, if desired, higher molding densities, for example in the region of 50 g/l or above, can also be produced. For this purpose, less strongly prefoamed particles are used; in addition, the weight of the molding can be controlled by the extent of the pressure treatment. A lesser pressure treatment leads to a higher weight of the molding and vice versa.

The moldings produced according to the present invention are of good quality. They have a high degree of cohesion. On fracture, crack formation is at least 90% through the foam particles. The surface of the moldings is smooth and virtually free of depressions. Corresponding to the tool, the formation of thin webs and edges is good. The shrinkage of the moldings is dependent on bulk density and has good reproducibility; it is typically 1.5% at 45 g/l and 4.2% at 15 g/l. For this purpose, a defined measured distance in the tool is compared with the molding dimension actually obtained after conditioning. The decrease is expressed as shrinkage in %. Advantageous fields of application are, inter alia, in the packaging sector and also soft upholstering in motor vehicle interiors.

Having generally described this invention, a further understanding can be obtained by reference to certain specific examples which are provided herein for purposes of illustration only and are not intended to be limiting unless otherwise specified.

EXAMPLES

Example 1

In a 60 l reactor, a suspension comprising

| | |
|---|---|
| 100.0 | parts of water, |
| 13.7 | parts of ethylene-propylene random copolymer |
| 5.62 | parts of n-butane (41.0 parts based on 100 parts of copolymer), |
| 0.1 | parts of tricalcium phosphate and |
| 0.05 | parts of MARLON ® A 360 | was heated and stirred for 30 minutes at 140° C. After this hold time, the reactor pressure was increased to 20 bar by pressurization with nitrogen. Subsequently, the reactor contents were discharged over a period of 20 seconds into a container at atmospheric pressure.

Strongly shrunken foam particles having a bulk density of 27 g/l were obtained.

Comparative Example 1

The procedure was exactly as in Example 1 with the sole difference that a lower amount of blowing agent, namely only 35.2 parts of n-butane based on 100 parts of copolymer, was used.

This gave foam particles having a bulk density of 27 g/l which are not shrunken and have a smooth surface.

Comparison of Example 1 and Comparative Example 1 show that the increase in the amount of blowing agent beyond a certain limit no longer results in any further expansion of the foam particles, but that from then on shrunken particles are obtained.

Comparative Example 2

The shrunken particles obtained in Example 1 were processed into moldings by the counter-pressure method. The molding used was a building block having dimensions of 360×120×150 mm with webs from 7 to 20 mm thick and maximum material thicknesses of up to 80 mm. Through the mold walls, which were fitted with nozzles, a steam pressure of 2.5 to 3.0 bar is passed in for from 6 to 8 seconds for intimate welding of the foam beads. Subsequently, the mold, and with it the molding, were cooled with water to about 60° to 80° C. It was found here that the shrunken particles can be processed into moldings having densities of from 24 to 50 g/l.

Comparative Example 3

The unshrunken foam particles obtained in Comparative Example 1 were processed into moldings exactly as in Comparative Example 2. This gave moldings having densities of from 50 to 75 g/l.

Example 2

The shrunken foam particles obtained in Example 1 were, prior to further processing, subjected to a pressure treatment. The foam beads were impregnated with air in a pressure tank at a pressure of 3.5 bar for 20 hours at room temperature. When these foam beads, provided with an internal pressure, were processed exactly as in Comparative Example 2, minimum densities of 12 g/l were achieved. Increasing the built-up pressure in the mold chamber or subsequent reduction of the mold volume (positive mold method) enable higher molding densities of up to 30 g/l to be obtained.

Comparative Example 4

The unshrunken foam particles obtained in Comparative Example 1 were further processed exactly as in Example 2. This gave moldings which had densities of from 25 to 55 g/l.

This application is based on German Patent Application DE 195 12 059.0, filed with the German Patent Office on Mar. 31, 1995, the entire contents of which are hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for producing a molding from prefoamed polyolefin particles, comprising the steps of:
   a) providing shrunken prefoamed polyolefin particles having a volume of from 30 to 95% of the original volume of the prefoamed polyolefin particles;
   b) treating the shrunken particles at a temperature lying at least 20° C. below the softening temperature of the shrunken particles, in an inert gas atmosphere under a gauge pressure of from 0.2 to 10 bar, for a time sufficient to provide expansion of the shrunken particles upon removal of said gauge pressure;
   c) charging the particles into a mold with substantial maintenance of internal pressure of the particles; and
   d) foaming the particles.

2. The process according to claim 1, wherein the gauge pressure of the inert gas is from 0.5 to 6 bar.

3. The process according to claim 1, wherein the inert gas used is air, nitrogen or $CO_2$.

4. The process according to claim 1, wherein the shrunken particles are essentially free of volatile organic blowing agent.

5. The process according to claim 1, wherein the prefoamed polyolefin particles comprise a propylene-ethylene random copolymer, a propylene-but-1-ene random copolymer or a random terpolymer of ethylene, propylene and but-1-ene.

6. The process of claim 1, wherein said sufficient time is from 5 min to 2 hours.

7. The process of claim 1, wherein said temperature of said treating step is $\geq 30°$ C. below the softening temperature of the shrunken particles.

8. The process of claim 1, wherein step b) is carried out in a pressure container other than the mold used in step c).

9. The process of claim 8, wherein the shrunken particles from the pressure container in step b) are conveyed to the mold in step c) by pressure difference acting as a driving force.

* * * * *